March 26, 1968     J. P. FRANCIS     3,375,036
WINDSHIELD WEATHER VISOR
Original Filed Jan. 3, 1966
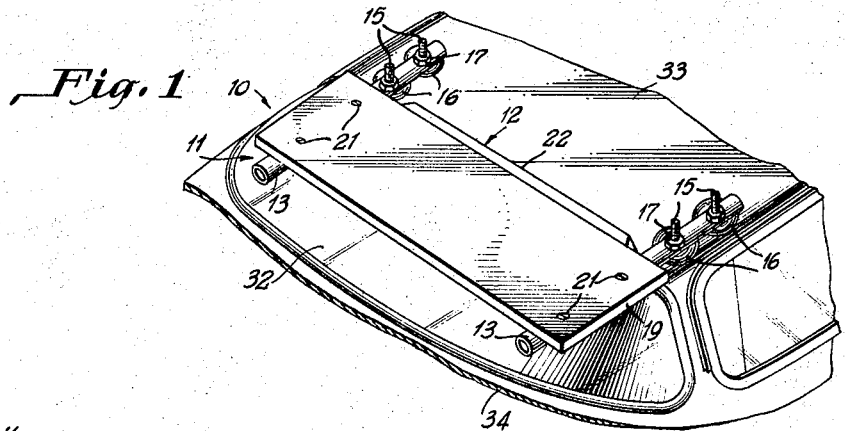
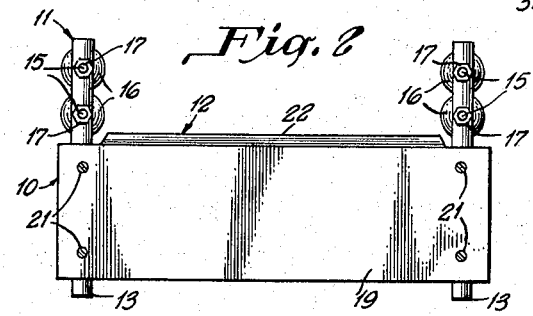
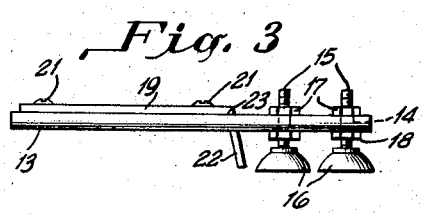
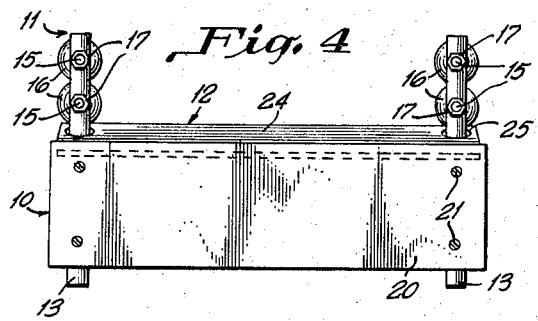
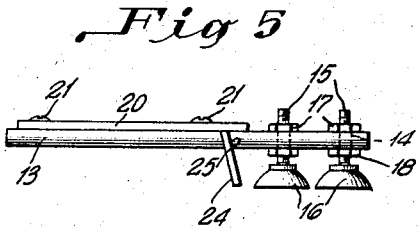
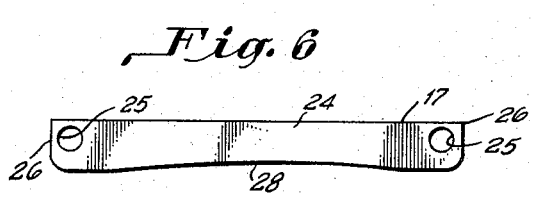
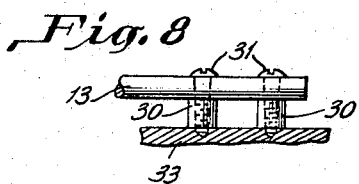
INVENTOR
John P. Francis United States Patent Office 3,375,036
Patented Mar. 26, 1968

3,375,036
WINDSHIELD WEATHER VISOR
John P. Francis, 20 Boston St., Haverhill, Mass. 01830
Original application Jan. 3, 1966, Ser. No. 518,484.
Divided and this application Dec. 13, 1966, Ser.
No. 619,095
2 Claims. (Cl. 296—95)

ABSTRACT OF THE DISCLOSURE

This invention provides weather protection to the windshield of an automobile when the vehicle is in a parked position. The removably attached rain visor panel, and the removably attached longitudinally disposed visor supports with the attached roof engaging means, may be removably attached as a complete unit, or in part, to or from the roof top of the automobile. The rear laterally disposed vertical weather flap of the visor panel freely engages the roof top to provide rain sealing engagement.

This is a division of application Ser. No. 518,484, filed Jan. 3, 1966, which is a continuation-in-part of application No. 471,764, filed July 13, 1965. Rain shield supports and rain shield structures are shown and described in my application, Ser. No. 471,764. My invention therefore, is concerned primarily with a weather visor flap structure.

This invention relates to windshield weather visors or weather protectors and the supporting means therefor for motor vehicles, and more particularly to a removable weather protector adapted for use in protecting the windshield area, or other glass or transparent areas of the vehicle from rain, sleet, snow or ice when the vehicle is parked in a drive-in theater, or any other outdoor parking area.

A main object of the invention is to provide a novel and vastly improved weather protector adapted to provide complete weather protection, regardless of the severity or the course of the falling precipitation, to the area to be protected by the removably attached automobile weather visor.

A further object of the invention is to provide a visor panel which is supported in spaced relation relative to the roof top and yet providing complete weather protection to the area or areas involved.

With these objects and still others in view, as will hereinafter more fully appear, the invention comprises certain novel constructions, combination and arrangement of parts, hereinafter described and claimed and illustrated in the accompanying drawings, in which:

FIGURE 1 is a perspective view, in fragment, of the front portion of an automobile, the view including a perspective view of the weather visor and the supporting means for supporting the device over the roof top and the windshield.

FIGURE 2 is a top plan view of FIGURE 1 showing the weather visor and the supporting means therefor.

FIGURE 3 is a side elevation view of FIGURE 2 showing the weather flap, which is a continuation of the visor panel.

FIGURE 4 is a top plan view of a modified form of a visor panel provided with a separable weather flap member.

FIGURE 5 is a side elevation view of FIGURE 4 showing the separable weather flap member engaging the underside of the visor panel.

FIGURE 6 is a front elevation view of a separable weather flap member provided with laterally spaced apart apertures.

FIGURE 7 is a front elevation view of a modified form of a separable flap member of shorter length; and FIGURE 8 is a side elevation view, in cutaway, showing a longitudinally disposed visor supporting member secured to the roof top by another form of roof engaging means.

Referring now more specifically to the drawings, attention is directed primarily to FIGURES 1, 2 and 3, wherein numeral 10 generally indicates the visor panel, shown also specifically as visor panel 19 and 20. Numeral 11 generally indicates the longitudinally disposed visor supports, shown also specifically as supports 13. Numeral 12 generally indicates the weather flap, shown also specifically as weather flap 22 and 24.

In FIGURE 1, a portion of an automobile 34 is shown with the visor panel 19, which in this embodiment is made of semi-rigid or rigid material, and which may be formed of a flexible or fabric material, supported by the longitudinally disposed visor panel supports 13.

The longitudinally disposed visor supports 11, shows specifically as tubular supporting members 13, are supported by the roof engaging means comprising the vacuum cups 16 which are attached to the vertically disposed threaded stud members 15. Attached to each stud member 15 is a lower threaded nut member 18 and an upper threaded nut member 17, each engaging the supporting member 13, with each stud member 15 adapted to engage the aperture 14, FIGURES 3 and 5, to removably support the supporting members 13 at the desired location, laterally and longitudinally on the roof top 33.

In FIGURE 8 there is shown modified roof engaging means in the form of longitudinally spaced apart cylindrical plug members 30, and provided with threaded screw members 31 adapted to firmly secure the visor supports 13 to the roof top 33 in spaced relationship.

In FIGURES 1, 2 and 3, there is shown a visor panel 19 removably secured to the longitudinally disposed visor panel supporting members 13 by threaded members 21. A weather flap 22, which is a continuation of the visor panel 19, is preferably of a substantially vertical dimension in order to provide a suitable downward and rearward angle when frictionally engaged with the roof top 33. The angled position of the said weather flap 22 provides complete weather protection from strong winds or heavy snowfall, thus the freely engaged extreme lower lateral portion of flap 22 is prevented from moving forwardly due to any force thereto.

In FIGURE 3 the visor panel 19 is shown provided with a bendable area 23, whereby the continuation of the visor panel 19 extends downwardly and rearwardly at an angle to provide the angled weather flap 22.

Referring to FIGURE 4, there is shown a top plan view of a modified form of a weather flap 24, which is a separable weather flap member 24 and which may be formed of rigid or flexible material and removably supported against the visor panel 20.

In FIGURE 5, a side elevation view of FIGURE 4, the separable weather flap member 24 frictionally and freely engages the underside of the visor panel 20, and is adapted to be movably supported on the longitudinally disposed visor supporting member 13.

Referring to FIGURE 6, the separable weather flap member 24 is shown provided with laterally spaced apart apertures 25 to supportably engage the longitudinal supports 13, as shown in FIGURES 4 and 5. The weather flap member 24 is formed of a straight lateral upper portion 27, with opposing ends 26, and a slightly arcuate bottom 28 to suit the lateral contour of the roof top 33. The flap member 24 is normally of a greater dimension in height than the space between the roof top 33 and underside of the visor panel 20, FIGURE 5, whereby the flap member 24 is suported angularly therebetween.

In FIGURE 7, a modified form of a separable flap member 29 is shown which is shorter than the embodiment of FIGURE 6, and which is adapted to be positioned in between the longitudinal supporting members 13, and in between the roof top 33 and the underside of the visor panel 20 for exceptionally fast and simple removable attachment, when required for any immediate use or removal.

The rigid or semi-rigid visor panel 10 may be made of plastic, sheet metal, waterproof cardboard, thin masonite, or any other suitable material. It is quite obvious that a flexible or a fabric visor panel may be used and supported upon the longitudinally disposed visor supports 11.

Referring back to FIGURE 1, the visor panel 19 is shown extending over the windshield area 32 of an automobile 34. The device is also adapted to be removably supported over the rear or side window, or, additional visor structures added for additional protection. The device is also used for protection from the sun and excessive heat developed on the vehicle.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. A weather visor for the windshield of a motor vehicle secured to the roof top thereof comprising a removably attached visor panel, longitudinally disposed laterally spaced apart visor supports, said visor panel being removably attached to and overlying the said visor supports, roof engaging means mounted on the roof top and engaging the rear portion of said supports in supporting said supports therefrom and over the roof top and the windshield area, and a removably attached weather flap having a lateral dimension substantially shorter than the said visor panel and a vertical dimension substantially greater than the vertical space between the underside of the said visor panel and the roof top, said removably attached weather flap adapted to be freely engaged between the said underside of the said rear lateral portion of said visor panel and the lateral portion of the roof top and extending at a downward and rearward angle from the said underside of the said rear lateral portion of the said visor panel onto the roof top to arrest forward movement of the extreme lower lateral portion of said weather flap, said extreme lower lateral portion of said angled weather flap freely engaging the lateral contour of the roof top in providing weather sealing engagement.

2. A weather visor for the windshield of a motor vehicle secured to the roof top thereof comprising a removably attached visor panel, longitudinally disposed laterally spaced apart visor supports, said visor panel being removably attached to and overlying the said visor supports, roof engaging means mounted on the roof top and engaging the rear portion of said supports in supporting said supports therefrom and over the roof top and the windshield area, and a rear laterally disposed weather flap having a lateral dimension substantially shorter than the said visor panel and a vertical dimension substantially greater than the vertical space between the rear lateral portion of said visor panel and the roof top and formed by a continuation of the said visor panel extending at a downward and rearward angle from the said rear lateral portion of the said visor panel onto the roof top and freely positioned between the said laterally spaced apart visor supports, said rearward angle of said freely suspended weather flap adapted to arrest forward movement of the extreme lower lateral portion of said weather flap, said extreme lower lateral portion of said angled weather flap freely engaging the lateral contour of the roof top in providing weather sealing engagement.

References Cited

UNITED STATES PATENTS

| | | |
|---|---|---|
| D. 186,431 | 10/1959 | Ottman. |
| 2,972,377 | 2/1961 | Jacobs _____ 296—95 |
| 2,984,300 | 5/1961 | Francis. |

FOREIGN PATENTS 232,036   12/1960   Australia.

LEO FRIAGLIA, *Primary Examiner.*

J. A. PEKAR, *Assistant Examiner.*